US007929961B2

(12) United States Patent
Struthers et al.

(10) Patent No.: US 7,929,961 B2
(45) Date of Patent: Apr. 19, 2011

(54) WALL MOUNTED DOCKING STATION

(75) Inventors: Scott Struthers, San Clemente, CA (US); Jerry Curtis, Buena Park, CA (US); Ray Call, Mission Viejo, CA (US); Jon Berges, San Clemente, CA (US)

(73) Assignee: Dana Innovations, San Clemente, CA (US)

( * ) Notice: Subject to any disclaimer, the term of this patent is extended or adjusted under 35 U.S.C. 154(b) by 0 days.

(21) Appl. No.: 12/839,645

(22) Filed: Jul. 20, 2010

(65) Prior Publication Data

US 2010/0310088 A1 Dec. 9, 2010

Related U.S. Application Data

(60) Continuation of application No. 11/753,513, filed on May 24, 2007, now Pat. No. 7,792,524, which is a division of application No. 11/585,039, filed on Oct. 23, 2006, now Pat. No. 7,493,142, which is a continuation of application No. 10/936,976, filed on Sep. 9, 2004, now Pat. No. 7,150,309.

(51) Int. Cl.
*H04W 4/00* (2009.01)
*H04B 1/20* (2006.01)
*H04R 1/02* (2006.01)

(52) U.S. Cl. ................. 455/422.1; 340/825.25; 381/386

(58) Field of Classification Search ............... 455/422.1, 455/420, 517, 186.1, 352, 3.03, 556.1, 444, 455/426.2; 709/208, 251, 201, 94, 231, 246; 381/81, 85, 80, 77, 386, 30, 59, 89, 332, 381/96, 24, 111, 116–117; 348/734; 340/3.71, 340/825.25, 426.34; 984/313, 362; 181/199
See application file for complete search history.

(56) References Cited

U.S. PATENT DOCUMENTS

| | | | |
|---|---|---|---|
| 5,292,092 | A | 3/1994 | Curtis et al. |
| 5,310,149 | A | 5/1994 | Struthers et al. |
| 5,423,500 | A | 6/1995 | Struthers et al. |
| 6,014,374 | A | 1/2000 | Paneth et al. |
| 6,501,389 | B1 | 12/2002 | Aguirre |
| 6,504,710 | B2 | 1/2003 | Sutton et al. |
| 6,519,144 | B1 | 2/2003 | Henrie et al. |
| 6,963,743 | B1 | 11/2005 | James |
| 7,155,214 | B2 | 12/2006 | Struthers et al. |
| 2002/0060247 | A1 | 5/2002 | Krishnaswamy et al. |
| 2006/0154642 | A1 | 7/2006 | Scannell, Jr. |

FOREIGN PATENT DOCUMENTS

| | | |
|---|---|---|
| GB | 2410845 | 8/2005 |

*Primary Examiner* — Melody Mehrpour
(74) *Attorney, Agent, or Firm* — Fish & Associates, PC

(57) ABSTRACT

A multi-zone audio system is provided that is portable to a handheld audio device at a plurality of locations. The system includes a multi-zone audio system controller having an audio input/output selection circuit for selectively regulating the source and distribution of audio signals. A plurality of handheld connector docks are distributed about the multi-zone system. Each connector dock is in communication with the audio system controller. The connector docks include a connector port, engagable to the handheld device, for communicating music/data/commands between the handheld device and the system controller. A plurality in-wall audio controllers are also distributed about the multi-zone system. Each in-wall controller is in communication with the audio system controller, and includes an input circuit for selective input of commands to regulate operation of the system controller and/or the handheld device. The handheld connector docks are operative to transfer music/data/commands between the audio system controller and a handheld device disposed within the connector dock.

6 Claims, 7 Drawing Sheets

WALL MOUNTED DOCKING STATION

CROSS-REFERENCE TO RELATED APPLICATIONS

This application is a continuation of utility application Ser. No. 11/753,513, filed May 24, 2007, which is a divisional of utility application Ser. No. 11/585,039 filed Oct. 23, 2006, now U.S. Pat. No. 7,493,142, issued Feb. 17, 2009, which claims priority to utility application Ser. No. 10/936,975 filed Sep. 9, 2004, now U.S. Pat. No. 7,155,214 issued Dec. 26, 2006 all of which are incorporated by referenced in their entirety.

STATEMENT RE: FEDERALLY SPONSORED RESEARCH/DEVELOPMENT

Not Applicable

BACKGROUND OF THE INVENTION

The present invention is directed to a connecting dock for porting handheld audio devices to a multi-zone audio system, and related connection circuits. More particularly, the present invention is directed to an apparatus and technique for integrating a handheld device to a multi-zone audio system to allow for integration of the handheld device into the audio system, and for distributed regulation of the handheld device, e.g. to regulate music played by the handheld device, from multiple locations about the multi-zone audio system.

Handheld devices have been widely used for recording and playing music and other material for many years. Such devices include a variety of MP-3 players, the iPod™ devices manufactured by Apple Computers, Inc. and Hewlett Packard Company. Such devices may be considered lifestyle devices, which facilitate the convenient transportation of music from one source/player to another, and allows local output of music and other audio programming through associated headphones. Such devices can be uploaded by connection to a personal computer, and download (play) music through the headphones, through the personal computer, or through home/auto connecting dock, such as the iPod marketed by Apple Computers, Inc., adapted for single zone/room audio distribution.

While such devices are useful to record and play back music on the handheld device, they do not take best advantage of the portability and other features of the handheld device as a source of high quality music. Such single zone audio systems are also typically characterized by device specific docking station connected to a local amplification/speaker distribution system.

The evolution of home audio systems has seen the introduction of sophisticated digital signal processors, adapted to interface with a wide range of audio/video equipment, and controllers therefore. Such equipment includes the Sonance Model DAB 1 audio controller/amplifier, the Sonance Navigator Harbor switch and the Sonance Navigator K1 and K2 controllers, marketed by Dana Innovations. Such devices allow for selective distribution of audio programming about a multi-zone system, with local zone controllers operative to regulate local, remote or system wide operation. The distribution of such controllers about the audio system allows for distributed control of the audio system from any zone.

A useful enhancement to contemporary audio systems would be an apparatus which allows the flexibility, sophistication and audio reproduction quality of multi-zone audio systems to be merged with the convenience and portability of handheld audio devices. As such, the lifestyle qualities of the handheld audio device may be used to enhance the enjoyment of the multi-zone audio system. In accordance with the present invention handheld device is nested to a convenient connector port, such that the handheld device will play to an audio system, or record files therefrom. The present invention provides a convenient and regulatable interface between a handheld device and an audio system, which enhances the use and enjoyment of both the audio system and the handheld device.

Many of the contemporary handheld audio devices are of unique shape, or have unique electrical interfaces. Consequently, it is also desirable to interface the handheld devices to the audio system in such a way to accommodate different handheld devices, both mechanically and electrically.

Additionally, insofar as contemporary handheld devices frequently utilize different electrical signal formats, it is desirable to provide a device which can readily interface with a variety of different handheld devices, without the need for a device specific electrical interface and control system. It is further useful to enhance the convenience of such an interface to allow for infrared or radio frequency control system, responsive to inputs from various receiver locations, to regulate operation of the handheld device, whether disposed locally or remote from a user, without the need for development of a unique electrical interface or any modification of the device circuitry.

It is further desirable that such an interface be wall mountable to facilitate convenient viewing of the handheld device and access to manual controls of the handheld device.

It is further desirable that the multi-zone audio system allow for engagement to a plurality of handheld devices, whereupon audio inputs from each of the handheld devices are selectively communicated to different zones of the multi-zone audio system, for simultaneous distribution of different audio programming to different audio zones.

The present invention is directed to achieving these and other goals within a simple, flexible device that consumes no table space and is architecturally compatible with flush-mounted in-wall/in-ceiling audio systems.

BRIEF SUMMARY OF THE INVENTION

A multi-zone audio system is provided that is portable to a handheld audio device at a plurality of locations. The system includes a multi-zone audio system controller having an audio input/output selection circuit for selectively regulating the source and distribution of audio signals. A plurality of handheld connector docks are distributed about the multi-zone system. Each connector dock is in communication with the audio system controller. The connector docks include a connector port, engagable to the handheld device, for communicating music/data/commands between the handheld device and the system controller. A plurality in-wall audio controllers are also distributed about the multi-zone system. Each in-wall controller is in communication with the audio system controller, and includes an input circuit for selective input of commands to regulate operation of the system controller and/or the handheld device. The handheld connector docks are operative to transfer music/data/commands between the audio system controller and a handheld device disposed within the connector dock.

In one embodiment, the in-wall controllers include an in-wall controller input circuit for inputting commands to regulate the audio system controller and/or the handheld device. The in-wall controller may include a display panel for displaying information/images.

In one embodiment the connector docks include a receiver circuit, in wireless communication with the handheld device, for receiving input signals from the handheld device when it is either disposed in the connector dock or removed therefrom. Input signals may be audio signals or input commands. The input signals may be communicated by infrared frequency signals or radio frequency signals. The signals may be command signals, data signals and/or music signals.

One or more of the handheld connector docks may also include an infrared transmission circuit having an input in electrical communication with the audio system controller and an output in infrared frequency communication with the handheld device, for transmission of music, data and/or commands to the handheld device.

In one embodiment the in-wall controllers are operative to convert infrared command signals, received from a remote infrared controller, into electrical signals for communication to the audio system controller, and to the handheld connector dock infrared transmission circuit, for infrared frequency communication to the handheld device.

The handheld connector port may further include an adapter bracket engagable to the connector dock, for interfacing model specific handheld devices to the connector dock.

The adapter bracket and/or the connector dock may include a translating member translating the handheld device into or out of engagement with the connector dock, to facilitate non-destructive engagement of the handheld device to the connector dock or adapter bracket.

Another embodiment to the invention incorporates a personal computer connection circuit, in electrical communication with at least one of the handheld connector docks. The computer connection circuit is operative to communicate music/data/commands between a personal computer and at least one of the audio system controller and the handheld connector docks. As a result, music, data and/or commands may be uploaded to and downloaded from the handheld device.

The computer connection circuit may also be operative to communicate an interface instruction set to the connector dock, for interfacing the handheld device to at least one of the personal computer system and/or the system controller. Communication between the personal computer and the audio system controller may be effected using an RS 232 signal line, and/or infrared signal line to regulate operation of the audio system controller.

The computer connection circuit may also include a connector dock switch, in electrical communication with the personal computer, the system controller and at least one of the connector docks for alternately engaging a personal computer and the system controller to the connector dock.

The connector dock may also include a mounting frame, and a plurality of engaging members connectable to a mounting frame, for securing the connector dock in flush mount engagement with the supporting surface.

In yet another embodiment, a plurality of handheld devices are utilized, each engaged to a separate connector dock. In this embodiment the audio system controller is regulatable to selectively distribute the received input signals from each handheld device to selected audio zones.

DETAILED DESCRIPTION OF THE PRESENTLY PREFERRED EMBODIMENTS OF THE INVENTION

The drawings shown herein are for the purposes of illustrating the preferred embodiments of the present invention and are not meant to limit in any respect the various aspects of the present invention described in this specification.

Figure 1:
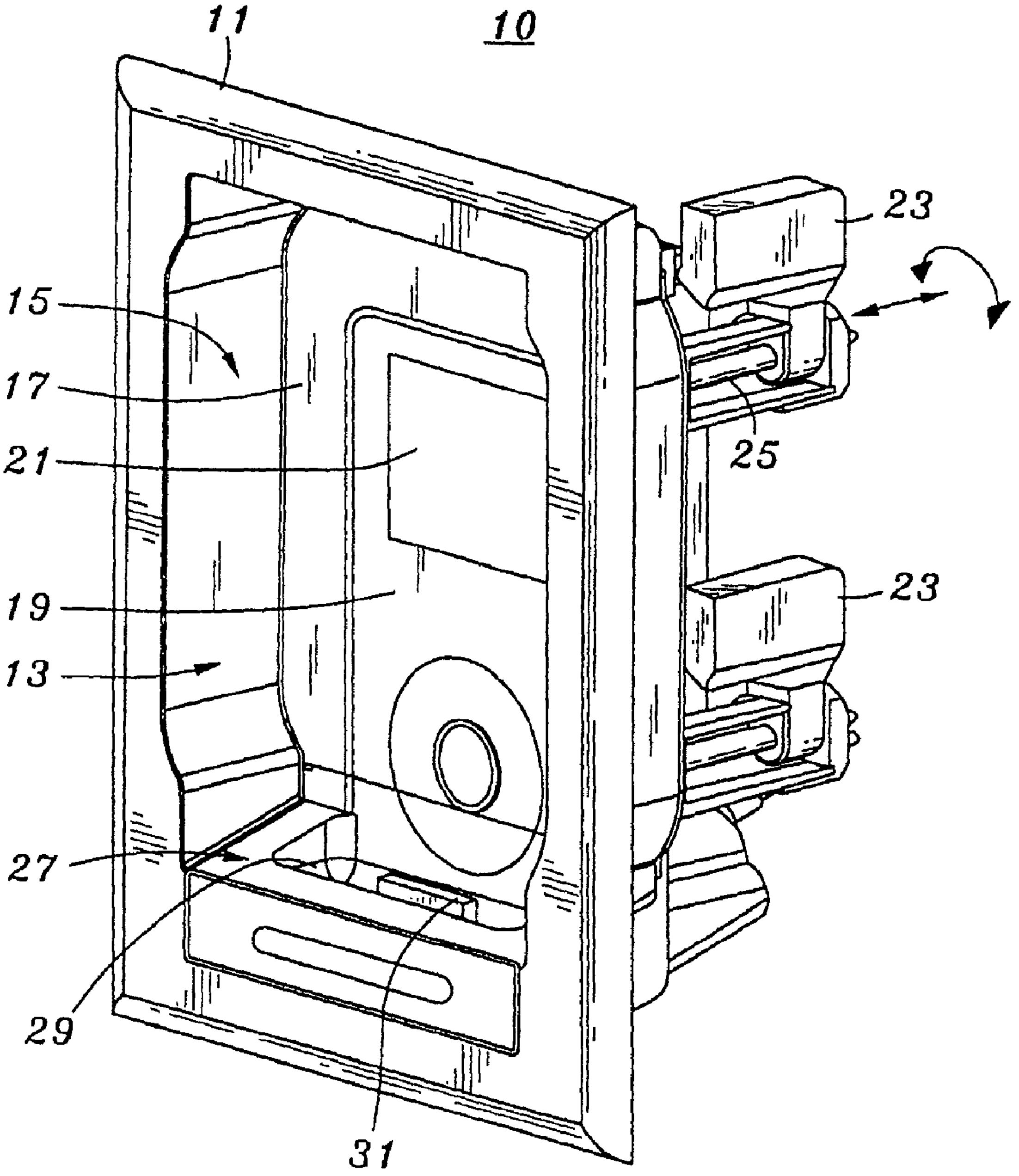
FIG. 1 is a front perspective view of a handheld connector dock.
Figure 2:
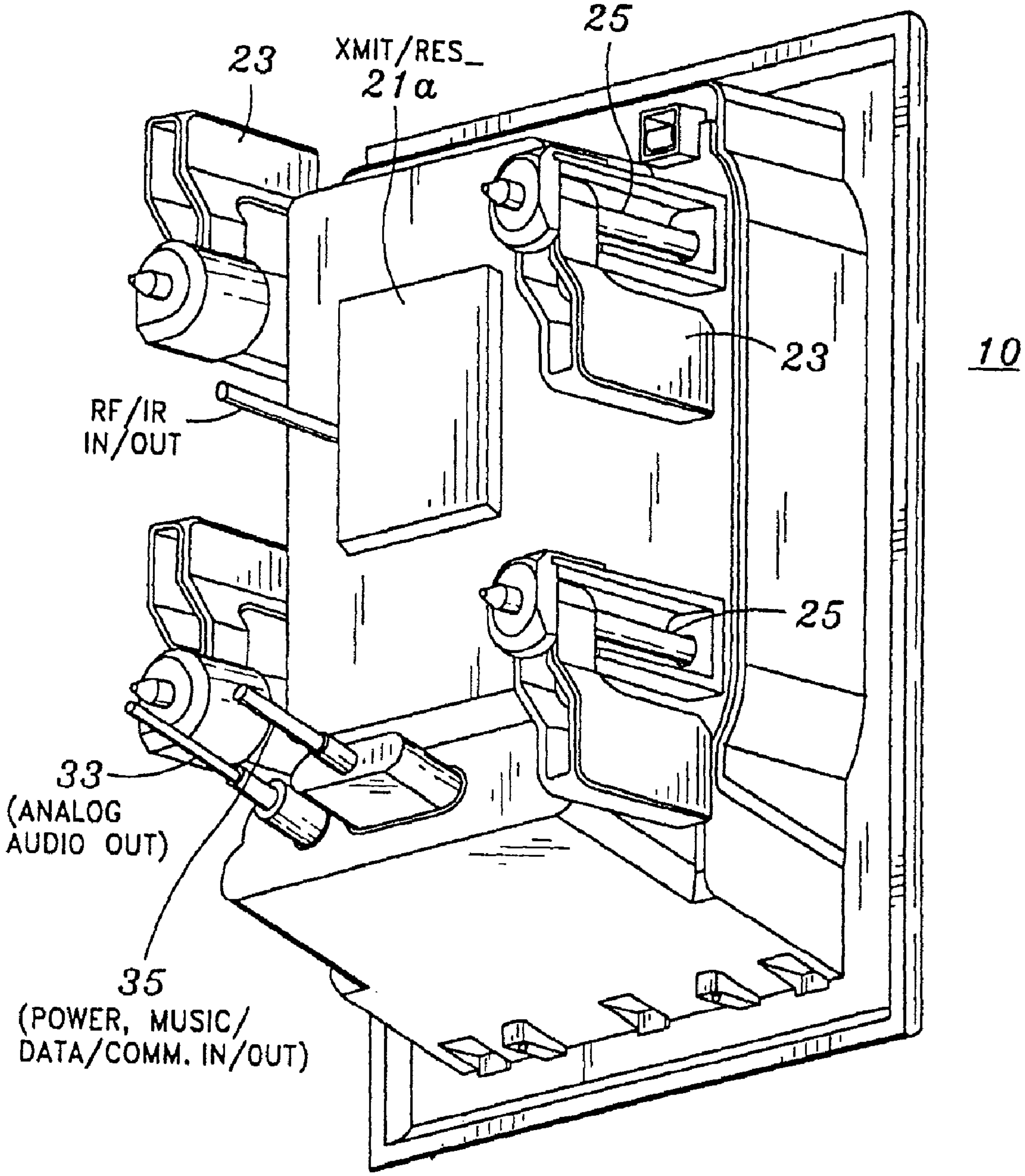
FIG. 2 is a rear perspective view of a handheld connector dock.

Referring to the drawings, FIGS. 1 and 2 are front and rear perspective views, respectively, of a handheld device connector dock 10, formed in accordance with one implementation of the present invention. The figures illustrate the physical construction of the connector dock, structure for flush mounting the connector dock to a wall surface, and the structure for mechanically and electrically interfacing a handheld audio device through the connector dock. Also illustrated are electrical connections for communicating music/data/commands between the handheld device and other portions of the audio system. Certain of the connectors are intended for operation when the handheld device is disposed within the connector dock. Other portions of the circuitry will be operative to communicate music/data/commands to or from the handheld device, when it is out of the connector dock.

Figure 3:
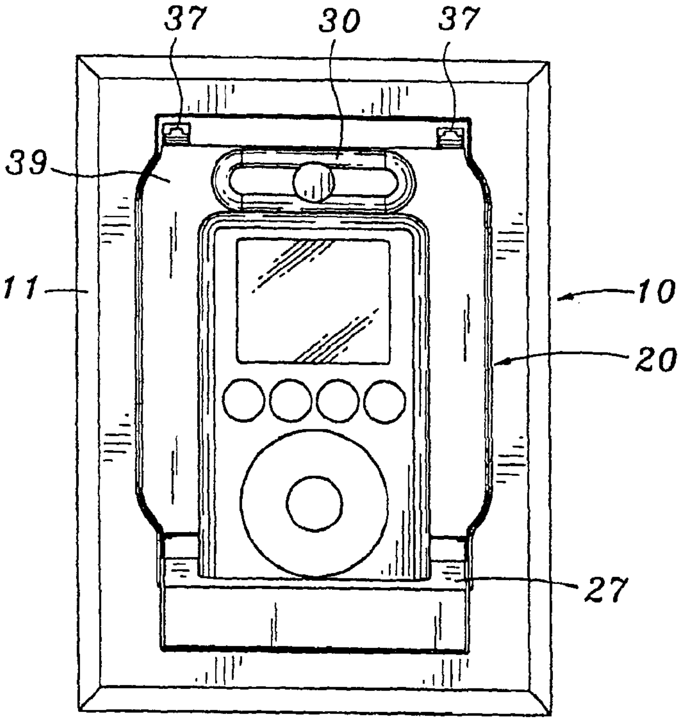
FIG. 3 is a front view of a handheld connector dock housing a handheld device, with an infrared receiving module thereon.

Referring more particularly to FIG. 1, the connector dock 10 is shown for receiving and engaging a handheld audio device, such as the device 20 illustrated at FIG. 3. The connector dock 10 includes a mounting frame 11 shaped to define a dock receiving well 13, into which the handheld device may be located. The mounting frame 10 further defines interior side walls 15 and back wall 17. A back plate 19 disposed against the back wall 17, may be formed as a decorative plate, or may support a transmitter receiver or transceiver 21 operative to transmit and/or receive infrared or radio frequency signals between the handheld device and the transceiver 21, whether the handheld device is located in or away from the connector dock 10. Alternatively, transceiver 21 may be formed on a rear surface of the connector dock, such as transceiver 21*a*, as shown at FIG. 2.

Transceiver 21, 21*a* may implement contemporary wireless protocols, such as 802.11 or Blue Tooth protocols for wireless communication of music/data/commands to and from a handheld device, whether the handheld device is disposed in the connector dock 10, or elsewhere within range of the transceiver. Similarly, where transceiver 21 is formed as an infrared transceiver, different protocols may be used to communicate with the handheld device, as may be supported by a particular handheld device or associated IR receiver module.

Referring again to FIGS. 1 and 2, the connector dock 10 includes a plurality of rotatable/translatable engaging members 23 which are connected to the mounting frame 11 via screws 25. The engaging members, or dawgs, 23 may be rotated to extend outwardly from the mounting frame 11, and translated towards the mounting frame by rotation of the screws 25. As such, the engaging members may be drawn closer to the mounting frame in a manner to capture an intervening wall surface, and thereby hold the connector dock securely in place against the wall surface.

Referring to FIG. 1, the connector dock 12 further includes a cradle 27 which defines a dock engaging well 29. The dock engaging well is preferably formed to be of a size and shape to receive and support the handheld device within the connector dock 10. In the presently preferred embodiment the cradle 27 is replaceable with alternate cradles defining different shapes of engaging wells, depending upon the shape and size of the particular handheld device to be placed within the connector dock 10.

Dock connecting port 31 is disposed within the dock engaging well 29, and operative to electrically engage a mating connector on the handheld device. Engagement of the dock connector port 31 to the handheld device defines an electrical interface connection between the connector dock 10 and the handheld device, whereby music/data/commands may be communicated to and from the handheld device when it is disposed within the connecting dock 10.

Referring to FIG. 2, exemplary electrical connections to the dock connecting port 31 are shown. In the presently preferred embodiment, electrical connections to the dock connecting port 31 include analog audio connector 33 and power/data/music/command connector 35. Analog audio connector 33 operates to port analog output signals from the handheld device to an analog audio input of the audio system controller. In the preferred embodiment connector 35 ports power to the handheld device, and communicates music/data/commands to and from the handheld device. However, more simple implementations are limited to one-way signal paths to or from the connector dock. Connectors 33 and 35 are in electrical communication with the dock connector port 31, shown in FIG. 1.

FIG. 3 illustrates a front view of connector dock 10, with a handheld device 20 disposed therein. The handheld device 20 is also shown to include an infrared receiving module 30, which is mounted upon and electrically engaged to the handheld device 20. Also shown at FIG. 3 are engaging members 37, operative to receive and engage back plate 39 in place within the connecting dock.

Figure 4:
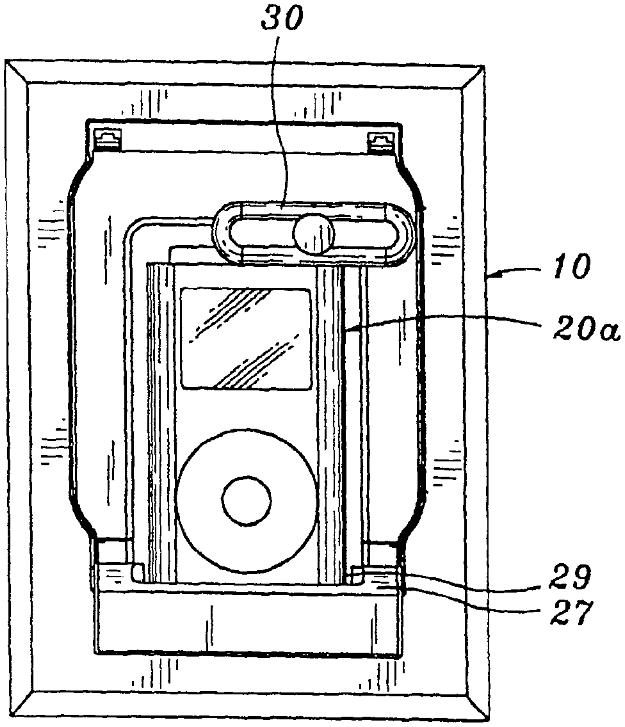
FIG. 4 is a front view of the connector dock, as illustrated in FIG. 3, wherein the infrared receiving module is oriented offset from center of the handheld device.

As noted above, different handheld device have different profiles, footprints and electrical connectors disposed at different locations. FIG. 4 illustrates use of the connecting dock 10 in conjunction with a different handheld device 20*a*. The handheld device 20*a* is constructed to mount the infrared receiving module 30 at a location horizontally offset from the center of the handheld device 20*a*. Moreover, as also shown in FIG. 4, the cradle 57 defines a dock engaging well 29 that is larger then the footprint of the handheld device 20*a*. In such circumstances the present invention contemplates such replacement of cradle 27 with a different cradle having a dock receiving well substantially formed to the footprint of the handheld device 20*a*.

When the handheld device 20, with IR receiver module 30 or an RF receiver engaged thereto, is disposed within the connector dock 10, the handheld device may be commanded by wireless signals communicated from transceiver 21 or 21*a* to regulate the operation of the handheld device. As explained below, such a configuration allows for simple control of the handheld device without the need for deriving electrical interface protocols for each device with which the connector dock is used. Infrared module 30 may be implemented as a component of a commercially available IR controller, e.g. the NaviPod IR remote marketed by Apple Computer, which includes the infrared receive module 30 and a handheld transmitter. The handheld transmitter may be directed towards the transceiver 21 or 21*a* to input infrared commands that operate the handheld device. Those commands may be learned by an audio system controller, such as the Sonance DAB 1 audio controller. Consequently, when a user desires to regulate the operation of the handheld device, e.g. to change songs, the audio system controller may be directed to generate an appropriate command which is communicated to transceiver 21 or 21*a* and wirelessly broadcast to the infrared module 30, which in turn communicates the appropriate command to the handheld device.

The infrared commands may similarly be learned by and communicated to audio system controller by in-wall controllers, such as the Sonance K2 controller, which includes an infrared receiver and manual input circuit, both of which communicate to the audio system controller to direct the audio system controller to generate appropriate commands. Those commands can then be communicated to the transceiver 21, 21*a* to regulate the operation of the handheld device 20, via transmission to the infrared receiving module 30.

Figure 5:
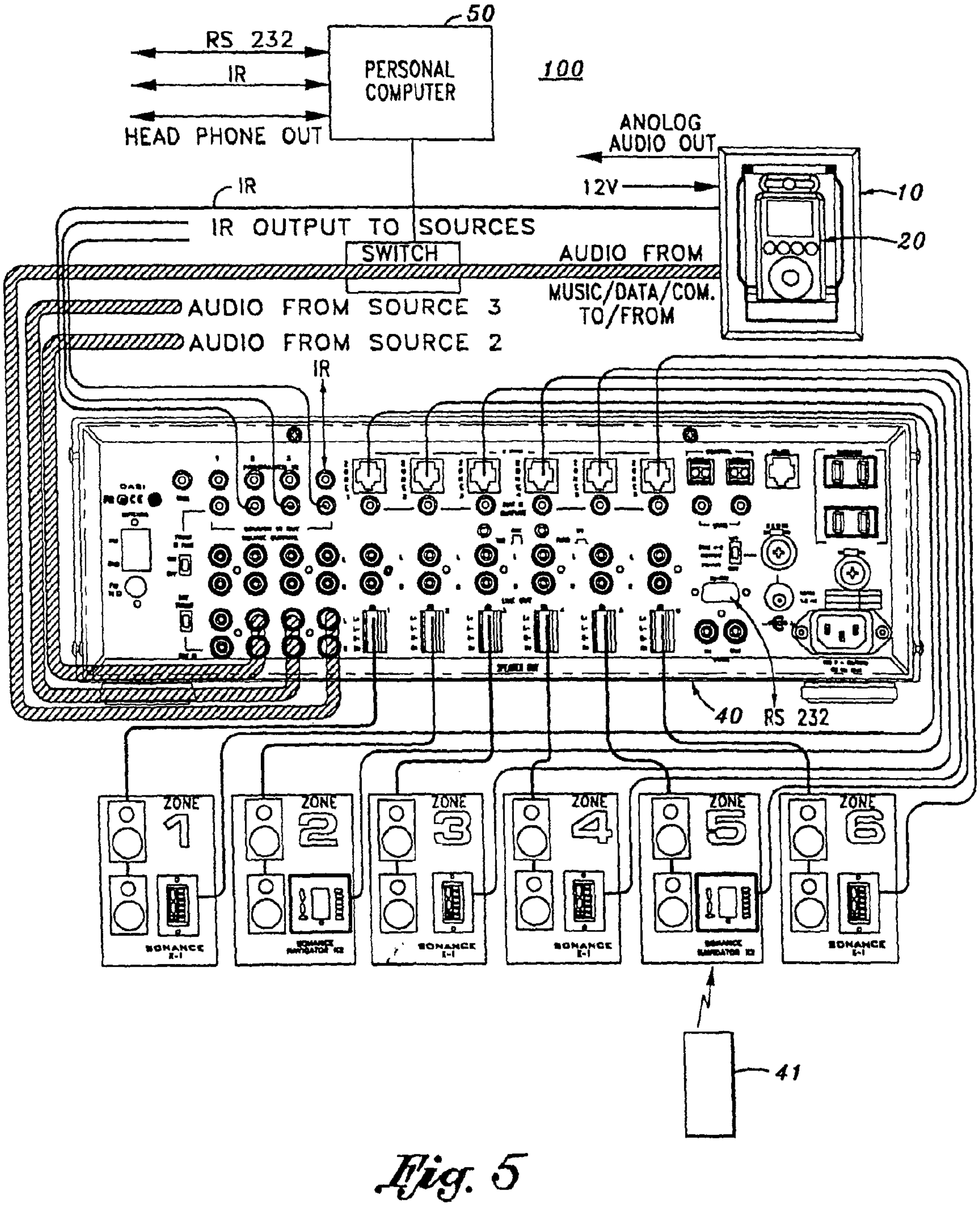
FIG. 5 is a wiring diagram illustrating connection of the handheld connector dock within a multi-zone audio system.

FIG. 5 illustrates an exemplary wiring arrangement for integrating the handheld device within connecting dock 10 within a multi-zone audio system 100. As shown at FIG. 5, the audio system controller 40 supports a plurality of audio zones, e.g. six zones. The controller 40 selectively distributes audio output to audio speakers, e.g. in-wall or in-ceiling speakers, disposed in any or all of the zones. Moreover, each zone is shown to include a keypad controller, which may be implemented as, for example, Sonance Navigator K1 controllers or Sonance Navigator K2 controllers marketed by Dana Innovations. Each of the controllers include a keypad for inputting commands to regulate the operation of the audio system controller 40. The K2 in-wall controllers shown in zones 2, 4 and 5 may further include a display and/or a receiver, e.g. infrared, RF or FM operative to receive commands, such as from a handheld having a receiving/learning circuit therein. The user may, therefore, regulate the operation of the handheld device, and the distribution of music to any or all zones, by operation of a portable transmitter used in the vicinity of any in-wall controller having in infrared RF or FM receiving circuit. As such, a user may place a handheld device within one of a plurality of connecting docks, distributed about a multi-zone audio system, and be able to control music played by the handheld device from any room/zone by either manually operating any accessible keypad, or directing an transmitter towards a receiving keypad, or dedicated receiver, from any zone within the system.

As will be recognized by those skilled in the art, command sets communicated to the handheld device by infrared transmission may be limited to a small group of commands. More refined control of the handheld device may be affected by manually operating the handheld device as it is disposed within the connecting dock, or by learning more detailed electrical for communication to the handheld device via the dock connecting port 31 (see FIG. 1). However, for many purposes the infrared command set may be sufficient for regulating operation of the handheld device, while avoiding complexities associated with deriving device specific electrical protocols.

Where more sophisticated regulation or operation is desired appropriate electrical protocols may be derived for two way electrical communication between the handheld device and the audio system controller 40 and/or personal computer 50.

Personal computer 50 functions to receive and store music or other files from the handheld device 10, or to port music or files to the handheld device 10. The computer 50 may also be used to port commands or an instruction set to the handheld device 10, for storage within flash memory The instruction set functions to facilitate communication between the handheld device and either the personal computer 50 or the audio system controller 40.

The personal computer 50 may also communicate electrical or infrared commands or control signals to the audio system controller 40. In the case of digital control signals, such signals may be communicated to an RS 232 input of the audio system controller 40. Infrared command signals may be communicated to an infrared input port of the audio system controller. Analog audio output signals from the personal computer 50 may be ported from the personal computer headphone jack to an appropriate audio source input to the audio system controller 40.

Figure 6:
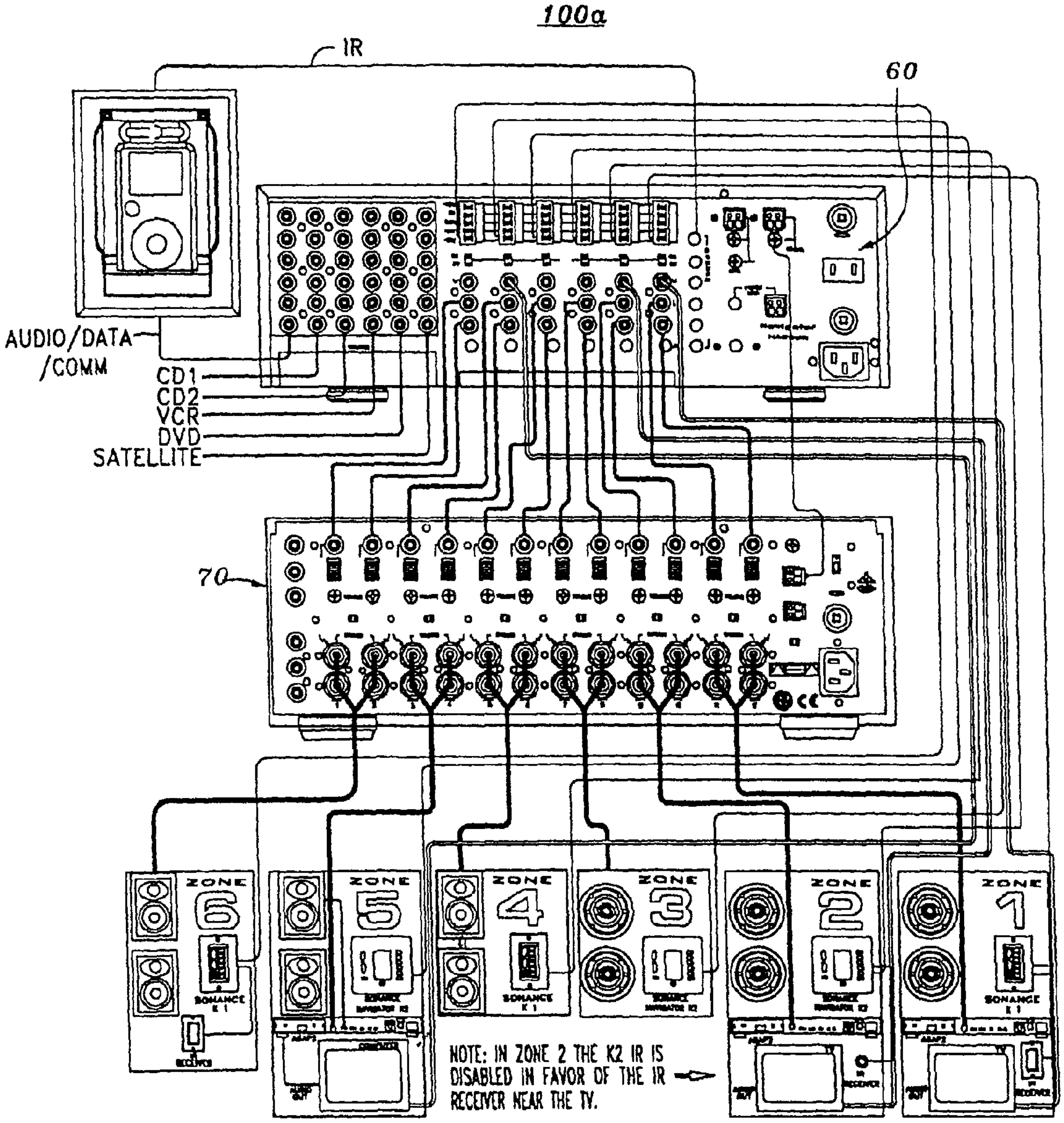
FIG. 6 is a wiring diagram illustrating connection of the handheld connector dock to an alternate implementation of a multi-zone audio/video system.

FIG. 6 illustrates wiring arrangement for an alternate implementation of the audio system 100*a*, useful to support audio and video sources/outputs. As shown therein the audio system controller is implemented to incorporate a separate switching device 60, connected to an amplifier 70. In the presently preferred embodiment the switching device 60 may be implemented as the Sonance Navigator Harbor, and the amplifier 70 may be implemented as the Sonance Model 1230 amplifier. Some of the zones are also shown to include video devices, see zones 1, 2 and 5. Some zones may further include a separate infrared receiver, see zones 1, 2 and 6. The remaining portions of the audio system 100*a* operate in substantially the same manner as described in connection with the audio system 100 illustrated at FIG. 5.

Figure 7:
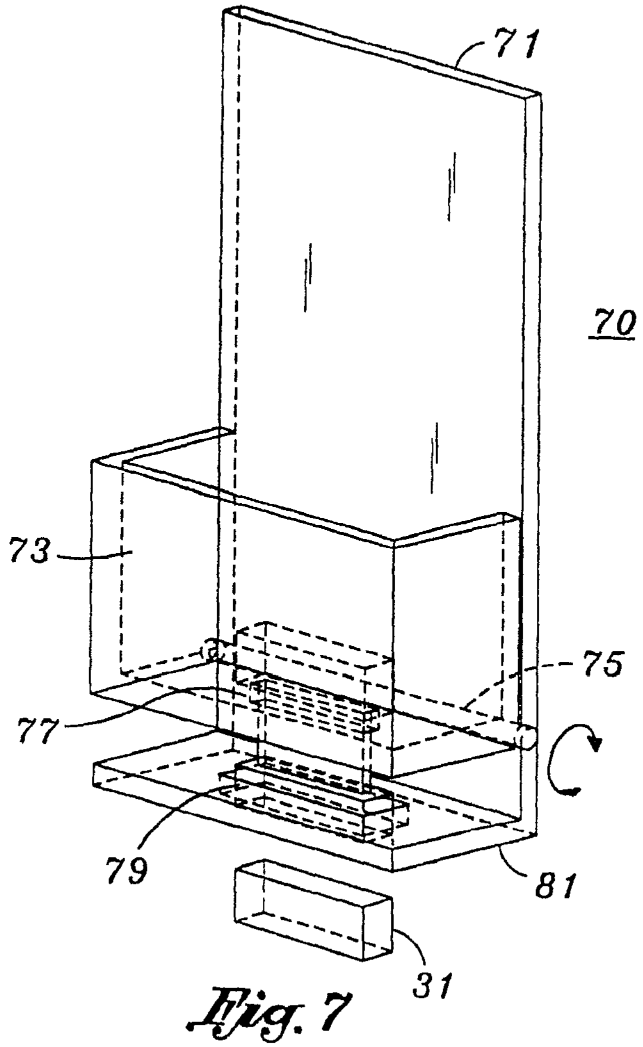
FIG. 7 is an illustration of a handheld device adaptor for interfacing the handheld devices to the connector dock.
Figure 8:
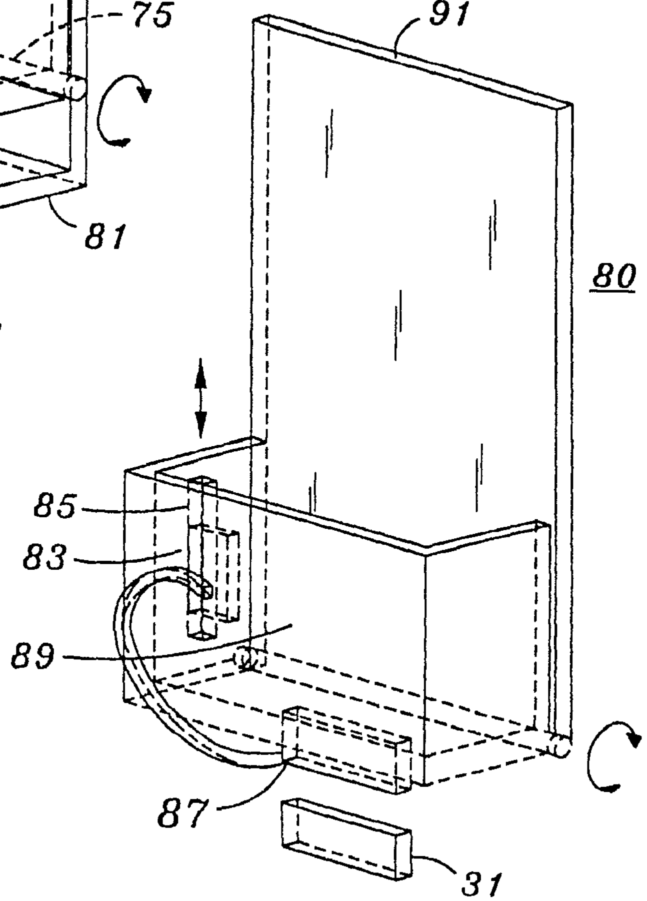
FIG. 8 is an illustration of an alternate handheld device adapter.

FIGS. 7 and 8 illustrate adapter brackets that may be used to facilitate engagement of the handheld device to connector dock. As noted above, in some case particular handheld devices may be formed to have electrical interfaces disposed at different locations, such as along the side edge of the device. In those cases an adapter is useful to facilitate interface of a model specific handheld device to the connector dock. Moreover, even where the handheld device incorporates a conveniently located electrical interface, an adapter bracket may be useful to facilitate engagement of the handheld device to the connector dock, without stressing the electrical connector port of the handheld device upon repeated engagement to the connecting dock. The adapters described in connection with FIGS. 7 and 8 are directed to providing such additional advantages to the connector dock and the audio system described above.

FIG. 7 is a perspective view of an adapter bracket 70 formed to receive a handheld device, and to facilitate engagement of the handheld device to the connector dock 10. Bracket 70 incorporates an adapter back wall 71 and a translating receiving bracket 73. The bracket 73 is connected to a translating member or hinge 75, such that the bracket 73 is rotatable from the closed position (shown) to an open position wherein greater space is available to insert the handheld device into the bracket. The bracket incorporates a connector 77, translatable with the bracket 73, for electrically engaging to the handheld device. Connector 77 in turn is connected to connector 79, which is formed on bracket lower surface 81. Connector 79 in turn is engagable to the dock connecting port 31, shown at FIG. 1.

FIG. 8 illustrates an alternate adapter bracket 80, formed to accommodate handheld devices having electrical interfaces formed on a side surface thereof. As shown in FIG. 8 connector 83 is arranged for electrical connection with such a handheld device. The connector 83 is translatable within channel 85 in order to accommodate handheld devices having side facing electrical interfaces, arranged at different vertical locations on the side surface of the handheld device. Connector 83 is further connected to connector 87, which in turn is engagable to the dock connecting port 31, also shown at FIG. 1. As with the adapter bracket shown in FIG. 7, adapter bracket 80 includes a translating receiving bracket 89, pivotally engaged to an adapter back wall 91 via a translating member or hinge 93.

Accordingly, the adapter brackets shown in FIGS. 7 and 8 may receive different types of handheld devices, whereby a range of handheld devices can be mechanically and electrically engaged to the adapter bracket for convenient interface to the connector dock 10.

Figure 9A:
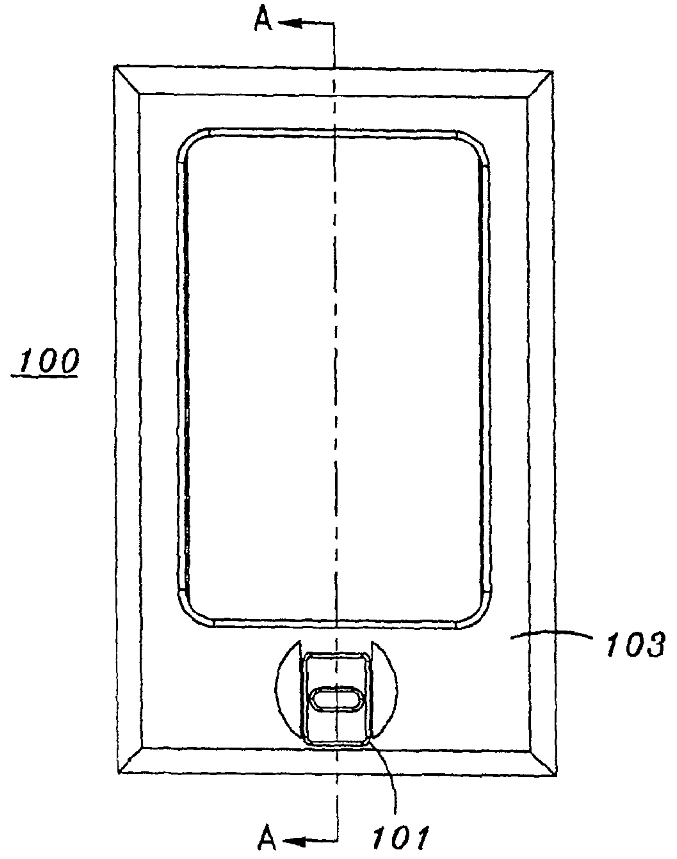
FIGS. 9*a, b* and *c* are a front, sectional and perspective views, respectively, of an alternate handheld connector dock, having a handheld device releasing lever formed on the front surface thereof.
Figure 9B:
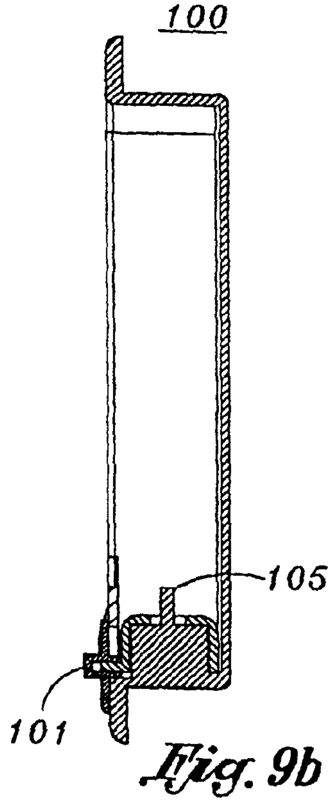
Figure 9C:
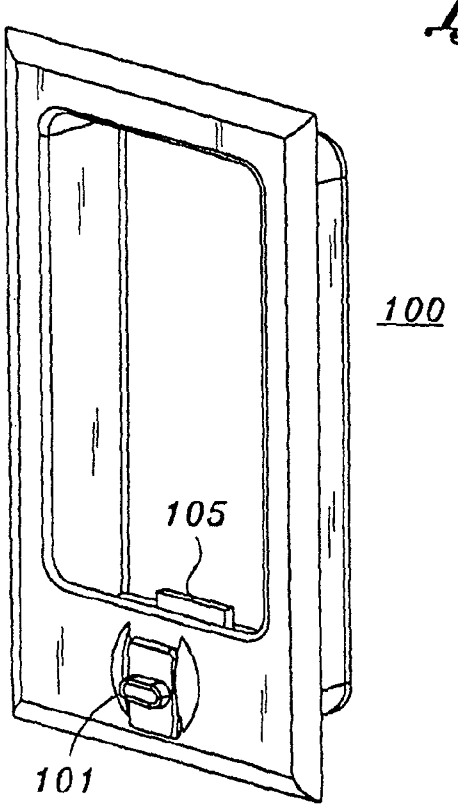

FIGS. 9*a, b* and *c* illustrate another enhancement of the connector dock. As shown therein the connector dock 100 incorporates a lever 101 disposed on the front surface 103. The lever 101 is manually translatable to urge the handheld device, when disposed within the connecting dock 100, upward and outward to facilitate removal of the handheld device from the connecting dock 100. More particularly, vertical translation of the lever 100 urges flange 103 upward against the handheld device, and urges the handheld device into contact with directing member 107. The directing member 107 is formed to urge an upward translating handheld device to be directed out of connecting dock 100, where it is more conveniently grasped by a user and removed from the connecting dock.

Translation of lever 101 further functions to disengage the electrical connection between the handheld device and the back connection port without the need for manually docking the handheld device or other motions that may contribute to deterioration of the dock connecting port or the electrical interface of the handheld device.

This description of the various aspects of the present invention is presented to illustrate the preferred embodiments of the present invention, and other inventive concepts may be otherwise variously embodied and employed. The appended claims are intended to be construed to include such variations except insofar as limited by the prior art.

What is claimed is:

1. A system for providing music to a distal speaker, comprising:

a wall-mounted docking station that receives a portable handheld device capable of storing and playing music;

a facility capable of carrying command signals from a distal source to the docking station; and a circuit capable of sending the music from the portable handheld device to the speaker.

2. The system of claim 1, wherein the facility comprises a wireless receiver capable of receiving the command signals.

3. The system of claim 1, wherein the facility is adapted to communicate with a commercially available audio system controller.

4. The system of claim 1, wherein the docking station has a video output.

5. The system of claim 1, further comprising alternative cradles capable of accommodating different ones of the handheld device.

6. The system of claim 1, wherein the docking station includes a connector capable of providing power to the handheld device.

* * * * *